United States Patent
Pearman et al.

(10) Patent No.: US 7,916,137 B2
(45) Date of Patent: Mar. 29, 2011

(54) GENERATION OF 3D LOOK-UP TABLES FOR IMAGE PROCESSING DEVICES

(75) Inventors: James Bernard Pearman, Glendale, CA (US); Scott Allen Bowser, Van Nuys, CA (US)

(73) Assignee: Panavision International, L.P., Woodland Hills, CA (US)

( * ) Notice: Subject to any disclaimer, the term of this patent is extended or adjusted under 35 U.S.C. 154(b) by 1024 days.

(21) Appl. No.: 11/715,772

(22) Filed: Mar. 7, 2007

(65) Prior Publication Data
US 2008/0218508 A1 Sep. 11, 2008

(51) Int. Cl.
*G06T 15/00* (2006.01)
*G06K 9/00* (2006.01)
(52) U.S. Cl. ........................ 345/419; 382/162
(58) Field of Classification Search .......... 382/162, 382/167; 345/419, 418, 589, 591, 600, 601; 358/1.9, 531, 504, 523, 532, 3.27
See application file for complete search history.

(56) References Cited

U.S. PATENT DOCUMENTS

| | | | |
|---|---|---|---|
| 5,055,928 A | 10/1991 | Klingelhofer | |
| 5,202,935 A * | 4/1993 | Kanamori et al. | 382/162 |
| 5,572,444 A * | 11/1996 | Lentz et al. | 702/117 |
| 6,057,866 A | 5/2000 | Haneda et al. | |
| 7,167,596 B2 * | 1/2007 | Yamamoto | 382/269 |
| 2004/0036898 A1 | 2/2004 | Takahashi | |
| 2005/0264836 A1 | 12/2005 | Gotoh et al. | |

* cited by examiner

*Primary Examiner* — Yon Couso
(74) *Attorney, Agent, or Firm* — Morrison & Foerster LLP (57) ABSTRACT

An image processor is disclosed which is capable of automatically generating a series of test signals, running the test signals through its image processing software and hardware, and capturing the resulting output signals to automatically generate a 3D LUT that represents most or all of the imaging processing steps being performed by the image processor. No external equipment is required to generate the 3D LUT. In other embodiments, the image processor may be connected to an external image processing device, and the image processor can then automatically generate a series of test signals, run those test signals through the external image processing device, and capture the resulting output signals to automatically generate a 3D LUT that represents most of all of the image processing steps being performed by the external image processing device.

20 Claims, 12 Drawing Sheets

GENERATION OF 3D LOOK-UP TABLES FOR IMAGE PROCESSING DEVICES

FIELD OF THE INVENTION

Embodiments of the invention relate to image processing devices, and more particularly, to the integrated generation of look-up tables that capture the processing steps and procedural processing of an image processing device.

BACKGROUND OF THE INVENTION

Figure 1:
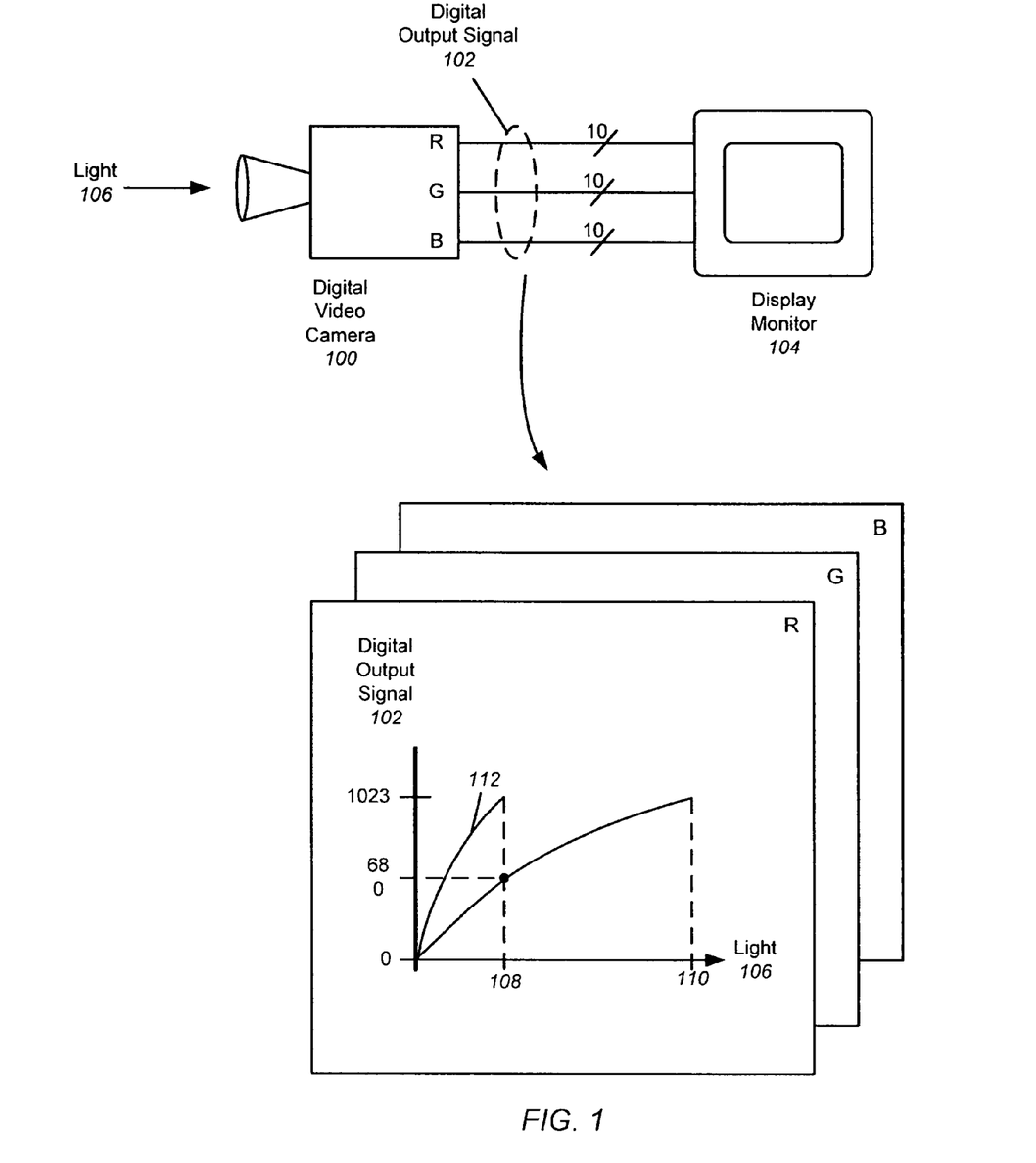
FIG. 1 illustrates an exemplary digital video camera capable of receiving light and generating separate multi-bit red (R), green (G) and blue (B) digital output signals tailored to feed a conventional display monitor.

As shown in FIG. 1, digital video cameras 100 receive light 106 and generate a digital output signal 102, which may be comprised of separate multi-bit (e.g. 10-bit) red (R), green (G) and blue (B) signals. Historically, these cameras 100 were expected to feed a live display, and thus image processing circuitry within the camera tailored the digital output signal 102 for a particular type of display monitor 104, such as a cathode ray tube (CRT) monitor, which produced unique color characteristics due to the physical properties of the CRT. Alternatively or additionally, the image processing was configured to emulate the color characteristics produced by a particular film negative and a particular print film type. In such systems, the display 104 merely reproduced an image according to the received digital output signal 102.

Conventional digital video cameras generate a digital output signal 102 as a function of the amount of light 106 received into the camera (see curve 112 in FIG. 1 representing the amount of light versus the digital output signal). This curve 112 is specifically designed to compensate for the non-linear color characteristics of a conventional display, so that the gamma-corrected result is a substantially linear response. Although only a single curve 112 is shown in FIG. 1 for clarity, it should be understood that a separate curve exists for each of the colors R, G and B. The digital output signal 102 is generally a multiple-bit signal (e.g., 10 bits) that represents a certain number (e.g., from 0 to 1023).

Note, however, that the amount or quantity of light 106 that a conventional digital video camera can convert to a digital output signal 102 (see point 108 in FIG. 1b) is much less than the entire amount or quantity of light available to be detected. In contrast, state-of-the-art high definition digital video cameras, such as the Genesis® video camera manufactured by Panavision Inc., are able to convert a much wider range of light (see point 110 representing the high end of this wide range of detectable light) to a digital output signal (see curve 114). Nevertheless, despite this wider dynamic range, only the amount of light detectable by conventional digital video cameras (see point 108 representing the high end of this more limited range of detectable light) is generally used for real-time display (monitoring) purposes, although the full dynamic range, including light levels above point 108, are recorded.

One side effect of the increased dynamic range of state-of-the-art digital video cameras is that when digital output signals from these video cameras are fed into conventional display monitors 104 such as CRTs, the image generally appears much darker than when conventional video cameras are used as the source of the digital output signals. This phenomenon is illustrated in FIG. 1, where for a particular light level 108, a conventional digital video camera may produce a maximum digital output signal 102 (e.g. a 10-bit value of 1023), while for that same light level 108, a state-of-the-art high definition digital video camera may produce a much lower digital output signal (e.g. a 10-bit value of 680). In other words, a state-of-the-art high definition digital video camera does not output a typical video camera signal, and does not convert the incoming light to a digital output signal in the same way as conventional digital video cameras.

Figure 2:
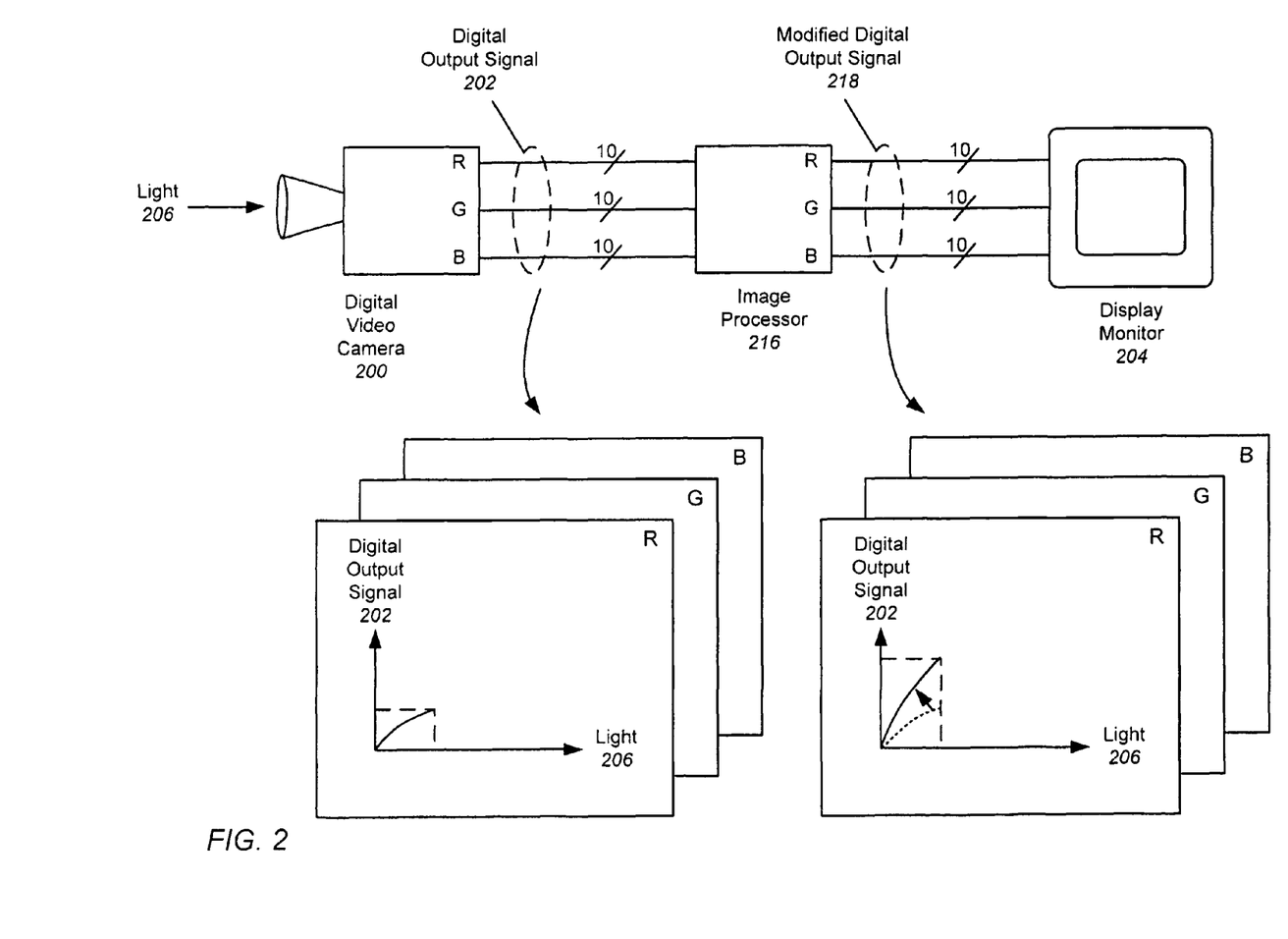
FIG. 2 illustrates an exemplary digital video system including an image processor coupled between a digital video camera and a conventional display monitor, the image processor for compensating for the generally lower digital output signal produced by state-of-the-art digital video cameras.

As illustrated in FIG. 2, to compensate for the generally lower digital output signal 202 produced by state-of-the-art digital video cameras 200 for a given light level as described above, and to provide the ability to perform procedural processing (adjusting parameters such as gamma, saturation, gain, contrast, pedestal, offset and the like), image processors 216 are typically connected between the camera 200 and the display 204. Among other things, the image processor 216 can receive the generally lower digital output signal 202 from a state-of-the-art digital video camera 200 and map or convert it to the full range digital output signal expected by the display 204 (see reference character 218), so that the resulting video image can be displayed at its proper intensity.

Image processors are manufactured by a number of companies, and each image processor may convert input video image data to output video image data using different processing steps. Additionally, controls are provided for adjusting various parameters. For example, the adjustment of gain, offset and saturation for each color, to name a few, may be performed in different orders, and the individual color adjustments may be performed in different orders. In addition, users of image processors may change image processing parameters in a number of different ways in a number of different sequences and yet achieve virtually the same desired color characteristics.

One conventional processing step utilized within image processors is the use of so-called three-dimensional (3D) look-up tables (LUTs). Input video image data can be applied to a 3D LUT to generate output video image data having video image characteristics specific to that particular 3D LUT. For example, a so-called "viewing LUT" may be employed to convert the generally lower digital output signal 202 from a state-of-the-art digital video camera 200 to a corrected full range digital output signal expected by the display 204, so that the resulting video image can be displayed at its proper brightness.

Figure 3:
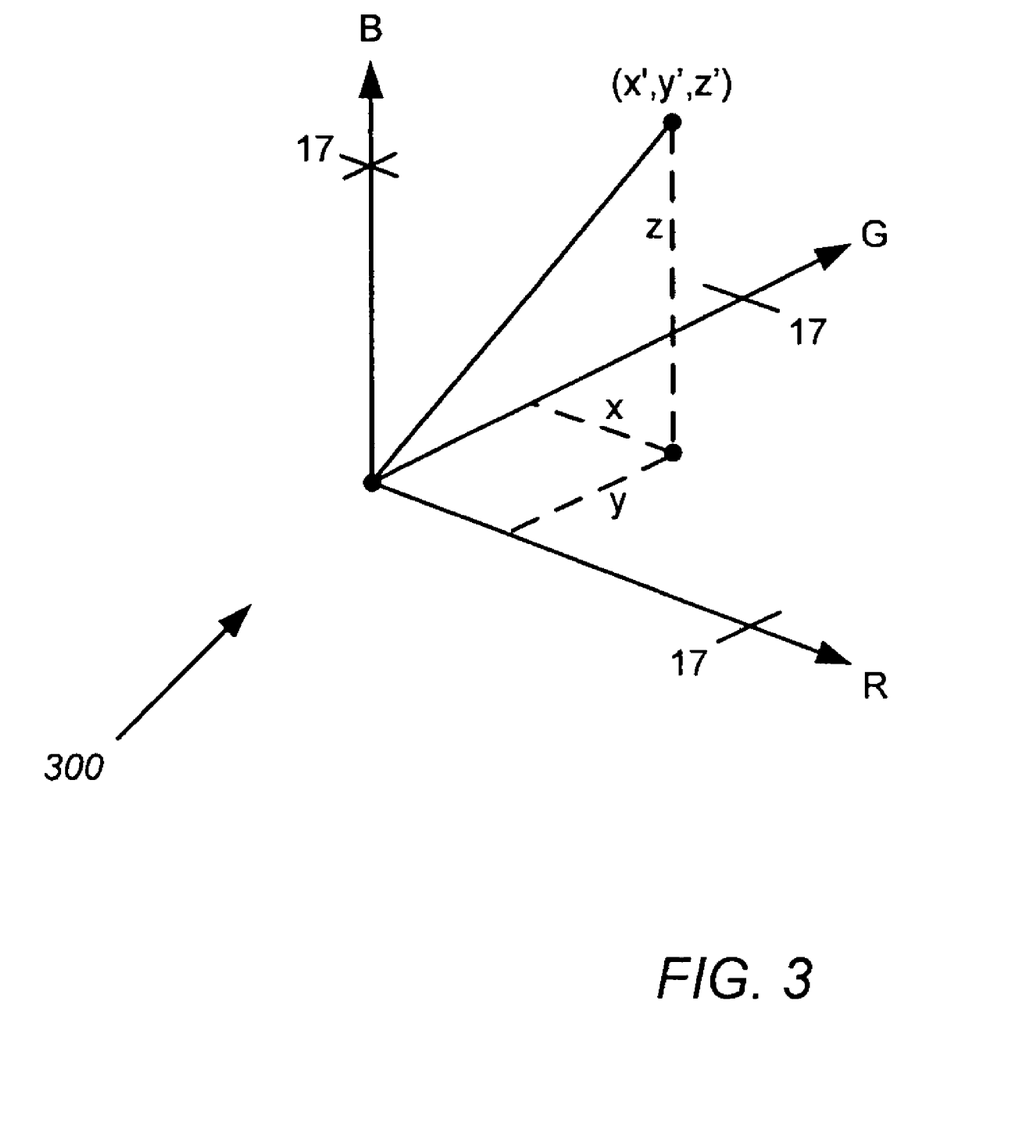
FIG. 3 illustrates an exemplary 3D LUT.

FIG. 3 graphically represents an exemplary 3D LUT 300. The term "3D" is used because three axes can be used to represent the colors R, G and B. For example, in FIG. 3 the color R is represented along the x-axis, the color G is represented along the y-axis, and the color B is represented along the z-axis. Although the digital output signal from the camera may provide a resolution of 10 bits (1024 values) per color, for example, generating an exhaustive table for all three colors would amount to a table containing 1024×1024×1024 entries, or over one billion entries. Therefore, in practical applications, the 3D LUT 300 may be comprised of a lower resolution table with a fewer number of entries, such as 17×17×17 entries, or less than 5000 entries. Each entry contains a triplet of values x', y' and z' for each color R, G and B, respectively, where x', y' and z' range from 0 to 1023 (a 10-bit value), for example.

When the actual 10-bit digital output signal values x, y, and z for each color R, G and B, respectively, are applied to the 3D LUT, where x, y and z range from 0 to 1023, the 3D LUT generates modified digital output signal values x', y' and z'. Note, however, that in embodiments in which the 3D LUT is a lower resolution table (e.g. 17×17×17 instead of 1024×102× 1024), the image processor may perform extrapolation on entries in the 3D LUT to obtain accurate x', y' and z' values.

Figure 4:
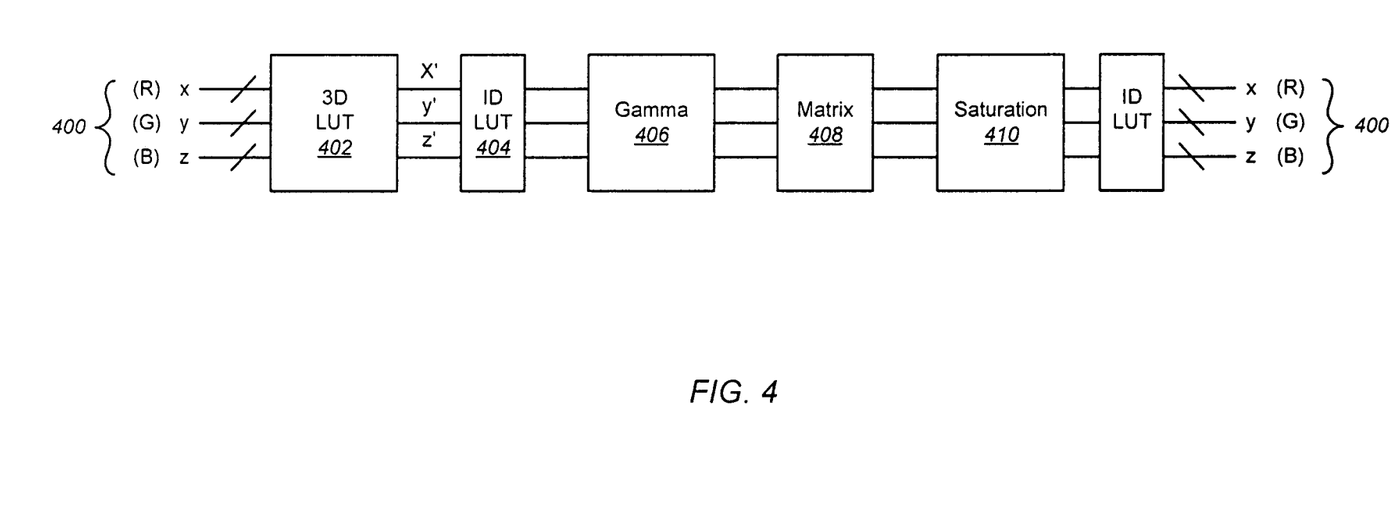
FIG. 4 illustrates a series of exemplary processing steps performed within an image processor for performing color conversion on a pixel-by-pixel basis.

FIG. 4 illustrates a series of processing steps performed within an exemplary image processor to perform color processing on a pixel-by-pixel basis (as opposed to spatial or temporal filtering or processing). In the example of FIG. 4, the original digital output signal 400 comprised of n-bit R, G and B signals x, y and z are fed into a 3D LUT 402, which may be utilized to perform color conversion and generated modified digital output signal values x', y' and z' as described above. The color converted digital output signal may then be fed into a one-dimensional (ID) LUT 404, which may be used for a number of purposes such as gain adjustments, black level adjustments, or gamma conversion. Note that the ID LUT 404 may be the only processing step needed if the image processor only adjusted the intensity of the image.

Next, the digital output signal may be gamma-converted in gamma (gain) processing block 406, and then fed into a matrix 408 which can perform intentional cross-contamination of one color with another (i.e. mixing of colors), adjust gain, saturation, and the like. The digital output signal may then be fed into a saturation processing block 410, to change the saturation of the image, and then to another ID LUT 412 to perform additional color conversion. The result of all image processing steps is a modified digital output signal values x", y" and z" (see reference character 414).

As noted above, the image processing steps illustrated in FIG. 4 are merely exemplary, and different steps and orders may be used. Because there is no standardized image processing methodology, the image processing steps used by one manufacturer and one user cannot easily be applied to another manufacturer's image processor. As a result, obtaining the same image processing results using different image processors has been difficult to achieve.

To overcome the incompatibilities between image processors, 3D LUTs have been used to capture most or all of the processing steps performed by an image processor (e.g. all of the steps shown in FIG. 4), including any 3D LUTs used as one of the processing steps. Using 3D LUTs allows different image processors to obtain the same image processing results by effectively replacing processing steps and parameter adjustments (i.e. all procedural processing) with a 3D LUT.

For example, suppose that a pre-configured 3D LUT was loaded into block 402 in FIG. 4 of an image processor, but the resulting display looked too "cold." Adjustments could then be made to the other processing steps in FIG. 4 to create a new color space and make the color look "warmer." The end result of the entire processing chain is that the 3D LUT stored in block 402 has been changed using the other processing steps. A new 3D LUT can then be captured to represent the entire processing chain. This new 3D LUT can then be transferred to other image processing devices to duplicate the captured effects. If, for example, other image processing devices had the same processing steps as shown in FIG. 4, the new 3D LUT would be stored in block 402, and all other processing steps would be set to have no effect. The resultant image processing in this other image processing device would be identical to the original image processor.

Figure 5:
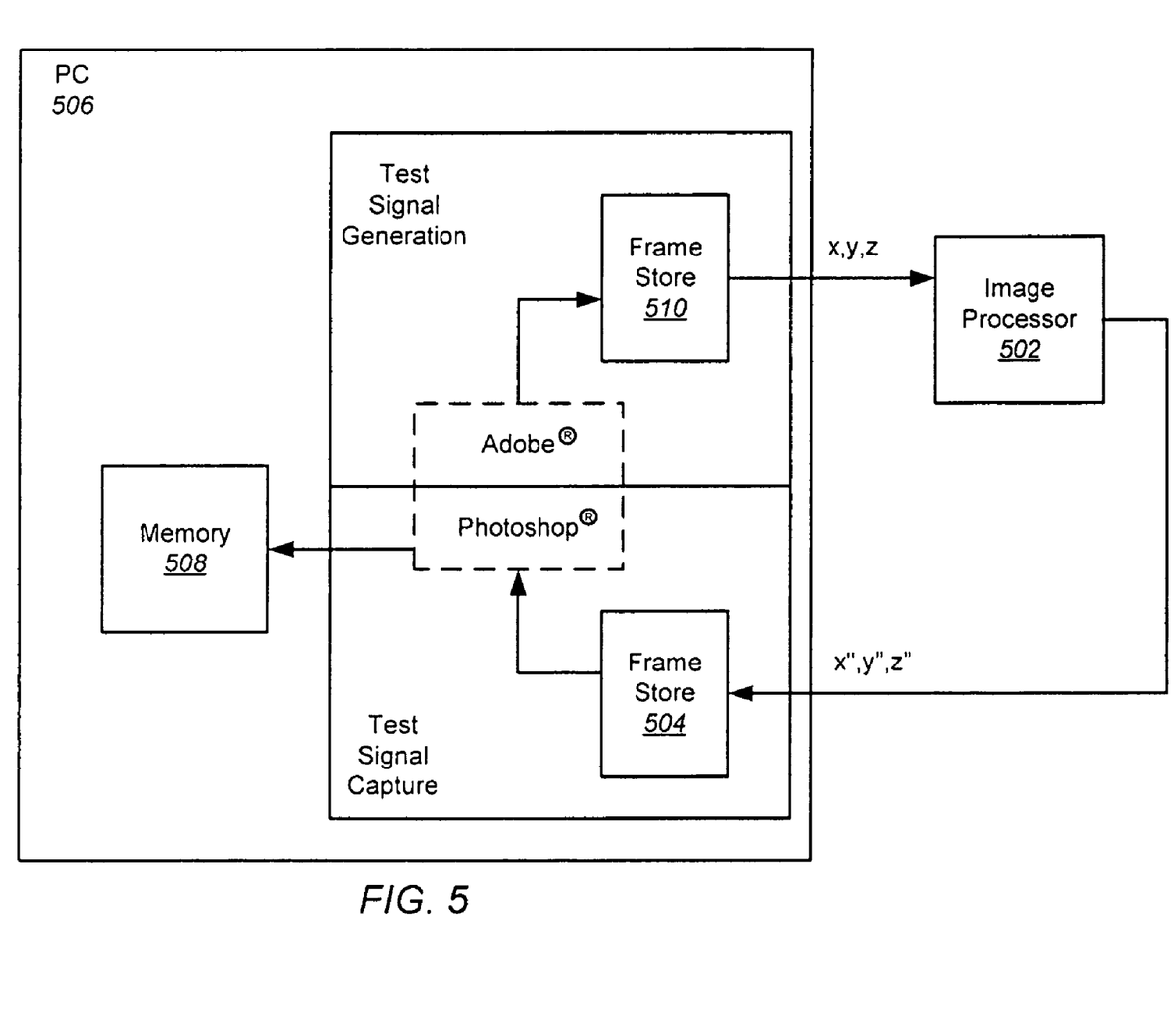
FIG. 5 illustrates an exemplary manual process for generating a 3D LUT, which requires that a PC be connected to the image processor.

However, heretofore it has been difficult to generate a particular 3D LUT for particular video image characteristics. Manual processes are required to generate a 3D LUT corresponding to a particular image processor's processing steps and settings. FIG. 5 illustrates an exemplary manual process for generating a 3D LUT, which requires that a PC 506 be connected to the image processor 502. In FIG. 5, a test signal x, y and z may be manually generated using a digital imaging application such as Adobes Photoshop® 500 in PC 506, stored in a frame store 510, and fed into image processor 502. The resultant output signal may be captured in a memory or storage such as a disk array or frame store 504 within the PC. Adobe® Photoshop® may again be used within PC 506 to generate the modified digital output signal x', y' and z', which may then be stored in a table in memory or storage 508. For each entry in the table, which can amount to thousands of entries, a particular x, y and z test signal value must be generated and applied, and the resulting x', y' and z' output values measured and stored. The complete 3D LUT can be generated only after this manual process is repeated for all entries in the table.

Therefore, there is a need for an image processor that can more efficiently generate a 3D LUT that represents its current image processing steps and settings. Furthermore, there is a need for an image processor that can efficiently generate a 3D LUT that represents the image processing of any external or third-party image processor.

SUMMARY OF THE INVENTION

Embodiments of the invention are directed to an image processor capable of automatically generating a series of test signals, running the test signals through its image processing software and hardware, and capturing the resulting output signals to automatically generate a 3D LUT that represents most or all of the imaging processing steps being performed by the image processor. No external equipment is required to generate the 3D LUT. In other embodiments, the image processor may be connected to an external image processing device, and the image processor can then automatically generate a series of test signals, run those test signals through the external image processing device, and capture the resulting output signals to automatically generate a 3D LUT that represents most of all of the image processing steps being performed by the external image processing device.

An image processor according to embodiments of the invention may include a video input for receiving a video image when the image processor is being used in its normal mode, which is to perform image processing (color conversion) on an incoming video image. However, within image processor is a test signal generator which is capable of automatically and sequentially generating a test signal when the image processor is being used to generate a 3D LUT representative of its image processing. Either the video input or the test signal generator can be switched to feed into an image processing block and a test output. Either the output of the image processing block or a test input can be switched to feed a video output or an RGB value measurement block. The RGB value measurement block may send the captured color data measured at each pixel in the image directly to an external computing device connected to the image processor via an interface connector, or alternatively it may be stored in memory or storage within the image processor for subsequent downloading to recordable media or to an external computer. The image processing section may also be connectable to the external computing device through the digital interface so that color manipulation can be controlled via an application running on the computing device.

In a normal mode, the image processor is connected to the output of a digital video camera, which provides a digital output signal to the video input of the image processor. The video input is switched to be connected to the imaging processing block, which may perform color conversion and other image processing effects on the digital output signal. The resulting output from the image processing is then provided at the video output, which may be connected to a display device. A computer may be connected to the image processing section to enable a user to control the image processing. An application running in the computer may provide a means for changing various color processing parameters and steps using a graphical user interface.

In a self-3D LUT generation mode, the test signal generator is switched to be connected to the image processing block, which may perform color conversion and other image processing effects on a test signal provided from the test signal generator. The resulting output from the image processing is then measured by RGB value measurement block, and stored in an external computer via an interface connector.

Thus, for example, after the image processor is operated in its normal mode and the image processing has been adjusted using the computer to generate desirable images on the display device, the image processor may be switched to the self-3D LUT generation mode. In this mode, without changing any of the image processing settings, a new 3D LUT representative of most or all of the image processing can be generated and captured in the computer. The resultant new 3D LUT can then be utilized by other image processors or post-production system to reproduce the image processing of the image processor.

In an external-3D LUT generation mode, the test signal generator is switched to be connected to the test output, which is connected to an external image processing device. The external image processing device may perform color conversion and other image processing effects on a test signal provided from the test signal generator. The resulting output from the external image processor is connected to the test input, which is switched to be connected to RGB value measurement block. The RGB value measurement block then measures the output from the external image processor, and stores this output in external computer via the interface connector.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be used and structural changes may be made without departing from the scope of the preferred embodiments of the present invention.

Embodiments of the invention are directed to an image processor capable of automatically generating a series of test signals, running the test signals through its image processing software and hardware, and capturing the resulting output signals to automatically generate a 3D LUT that represents most or all of the imaging processing steps being performed by the image processor. The image processor is self-contained, in that no external equipment is required to generate the 3D LUT. In other embodiments, the image processor may be connected to an external image processing device, and the image processor can then automatically generate a series of test signals, run those test signals through the external image processing device, and capture the resulting output signals to automatically generate a 3D LUT that represents most of all of the image processing steps being performed by the external image processing device.

Although some embodiments of the invention may be described herein in terms of digital video signals from a digital video camera, embodiments of the invention may be generally applicable to other types of digital images, such as images from digital photography.

Figure 6A:
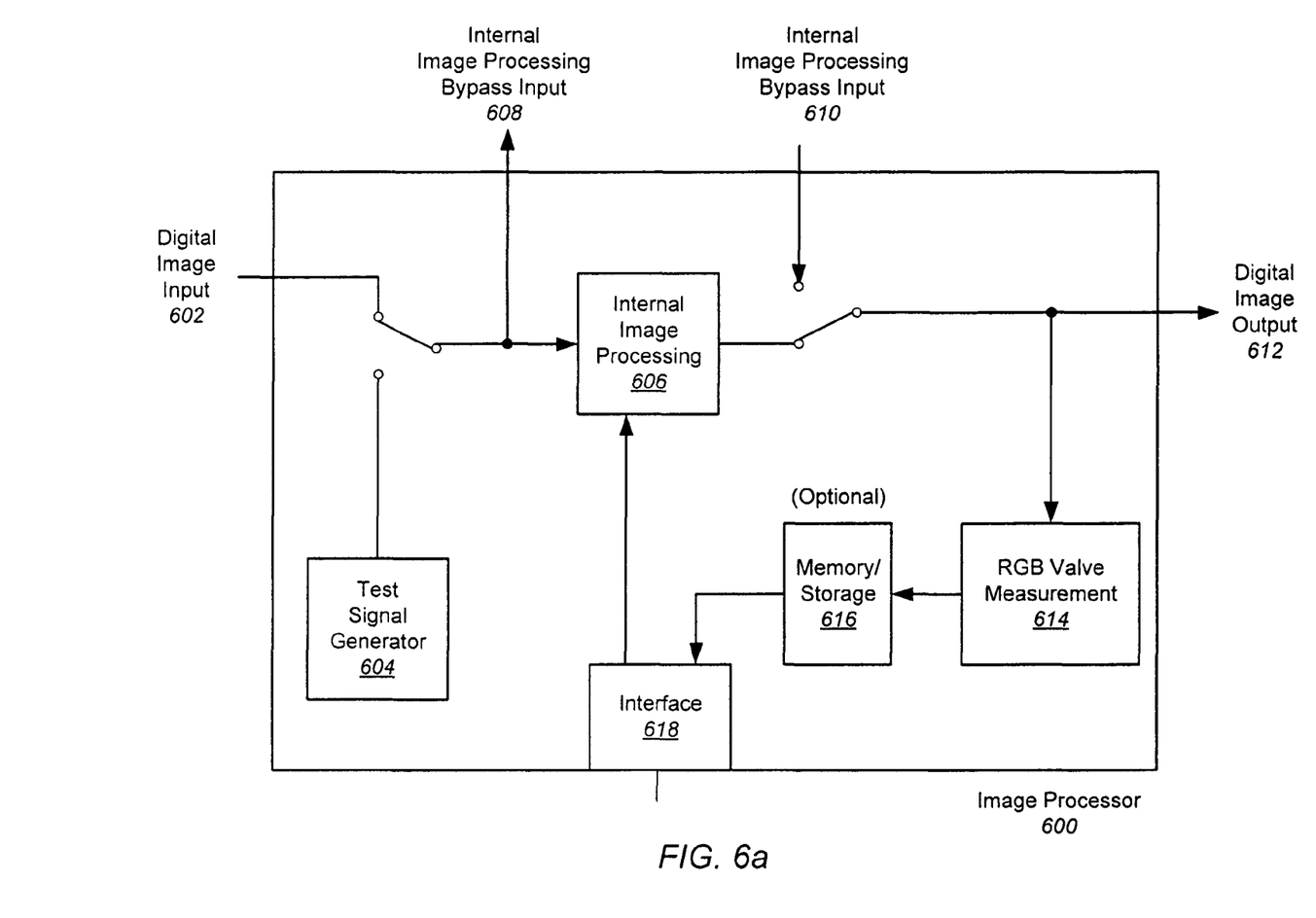
FIG. 6a illustrates a exemplary image processor according to embodiments of the invention.

FIG. 6a illustrates an exemplary image processor 600 according to embodiments of the invention. In FIG. 6a, a digital image input 602 is provided for receiving digital image data when the image processor 600 is being used in its normal mode, which is to perform image processing on incoming digital image data. The digital image data may be received from a digital video camera or any other source capable of providing digital image data.

Within image processor 600 is a test signal generator 604 which is capable of automatically generating digital test patterns when the image processor is being used to generate a 3D LUT representative of its image processing. For example, if a 17×17×17 3D LUT is to be generated, the test signal generator 604 must be capable of generating 17×17×17=4913 different x, y, z RGB combinations, each representing a different test pattern. The test patterns may be presented in a single frame containing a "checkerboard" of different test patterns. In other words, the test signal generator 604 can be thought of as generating a mosaic of 4913 different patches of color. Alternatively, depending on the number of different test patterns that are required, multiple frames may be generated, each frame containing one or more test patterns in any suitable arrangement, such as a checkerboard of test patterns, vertical or horizontal stripes of different test patterns, or even a single solid test pattern per frame. Either the&digital image input 602 or the test signal generator 604 can be switched to feed into the image processing block 606 and an internal image processing bypass output 608.

Either the output of the internal image processing block 606 or an internal image processing bypass input 610 can be switched to feed a digital image output 612 or an RGB value measurement block 614. The RGB value measurement block 614 may have counters that count the horizontal pixels (x) along a line, and counters that count the number of lines (y) in the image. A "measurement" of color is taken along various x and y locations. The measurements for a particular line may then be captured in a line store. The RGB value measurement block 614 may send the captured color data measured at each pixel in the image directly to an external computing device connected to the image processor 600 via interface connector 618, or alternatively it may be stored in memory or storage 616 within the image processor for subsequent downloading to recordable media or to an external computer. The internal image processing section 606 may also be connectable to the external computing device through interface 618 so that color manipulation can be controlled via an application running on the computing device.

Figure 6B:
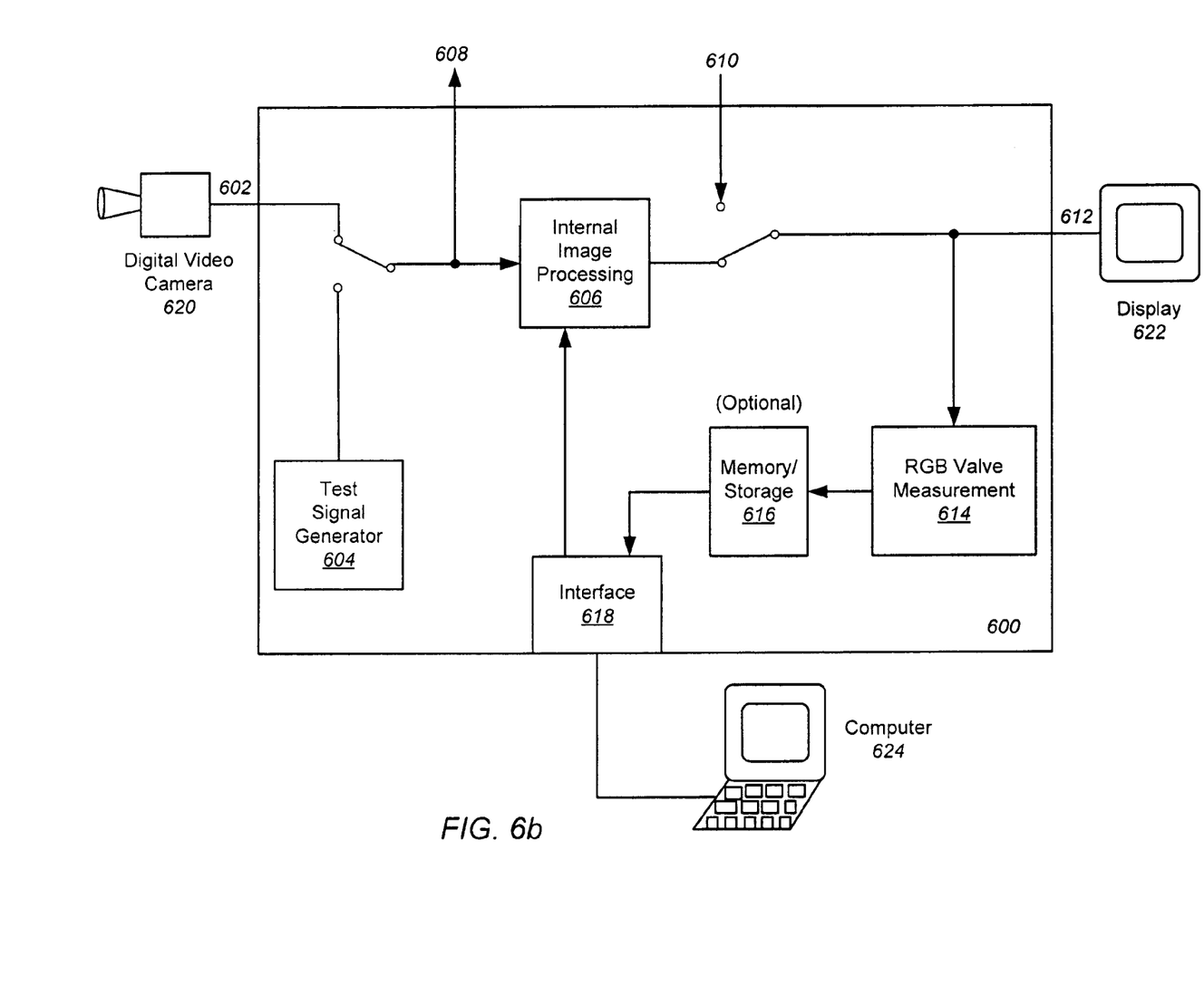
FIG. 6b illustrates an image processor in an exemplary system environment and operating in a normal mode according to embodiments of the invention.

FIG. 6b illustrates the image processor 600 in an exemplary system environment and operating in a normal mode according to embodiments of the invention. In the example of FIG. 6b, the image processor 600 is connected to the output of a digital video camera 620, which provides a digital output signal to the digital image input 602 of the image processor. The digital image input 602 is switched to be connected to image processing block 606, which may perform color conversion and other image processing effects on the digital output signal. The resulting output from the image processing is then provided at the digital image output 612, which may be connected to a display device 622. A computer 624 may be connected to the image processing section 606 via interface 618 to enable a user to control the image processing. An application running in the computer 624 may provide a means for changing various color processing parameter and steps using, for example, a graphical user interface.

Figure 6C:
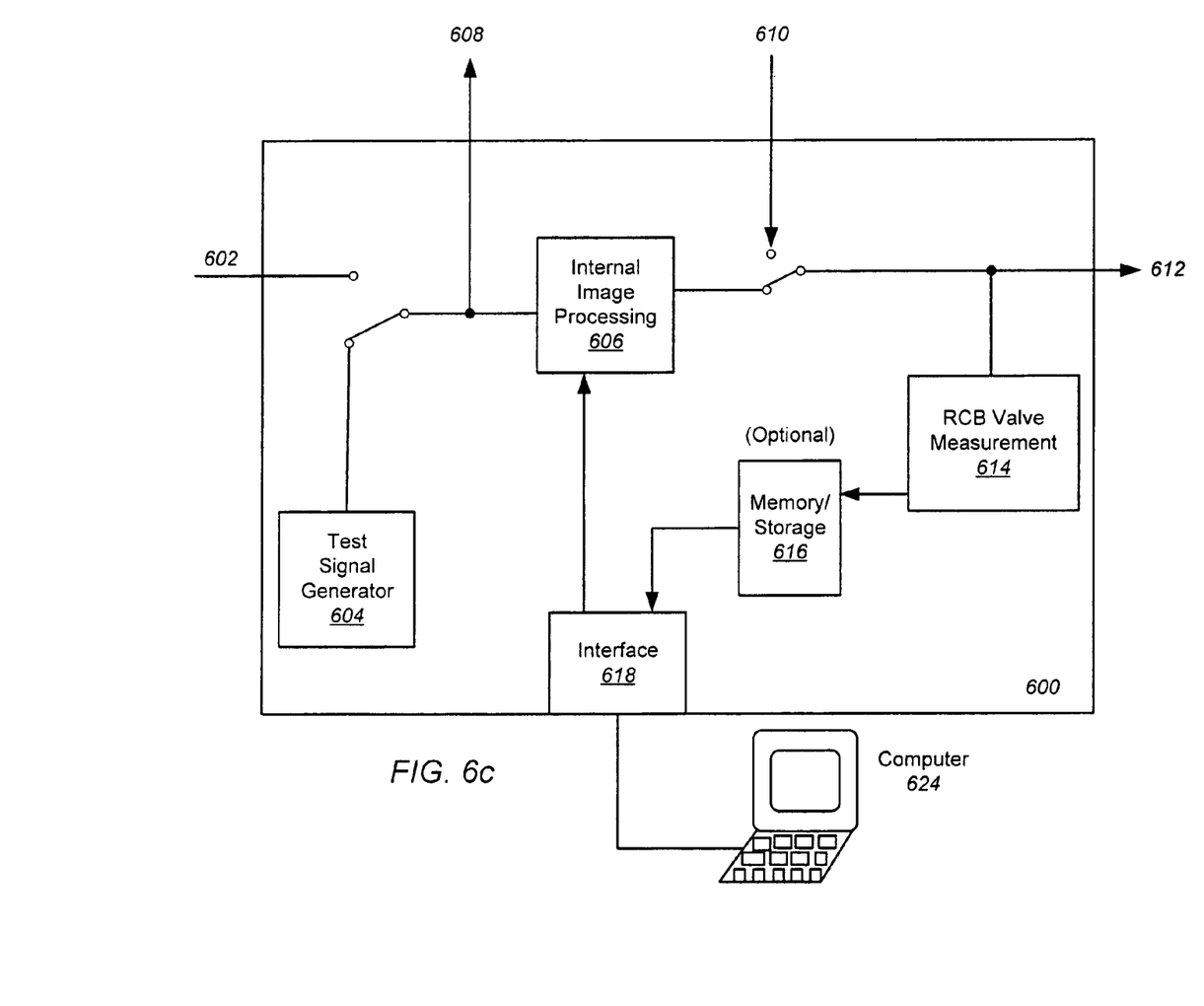
FIG. 6c illustrates an image processor in an exemplary system environment and operating in a self-3D LUT generation mode according to embodiments of the invention.

FIG. 6c illustrates the image processor 600 in an exemplary system environment and operating in a self-3D LUT generation mode according to embodiments of the invention. In the self-3D LUT generation mode, the test signal generator 604 is switched to be connected to internal image processing 606, which may perform color conversion and other image processing effects on the test patterns provided from the test signal generator. The resulting output from the image processing is then measured by RGB value measurement block 614, and stored in an external computer 624 via interface 618.

In one particular use example, after the image processor 600 is operated in its normal mode as shown in FIG. 6b, and the internal image processing 606 has been adjusted using computer 624 to generate desirable images on display device 622, the image processor may be switched to the self-3D LUT generation mode as shown in FIG. 6c. In this mode, without changing any of the internal image processing settings, a new 3D LUT representative of most or all of the internal image processing 606 can be generated and captured in computer 624. All image processor settings, such as those for pre-gamma, gain, pedestal, saturation and the matrix may be taken into account in the new 3D LUT. The resultant new 3D LUT can then be utilized by other image processors or post-production system to reproduce the image processing of the image processor 600.

Figure 6D:
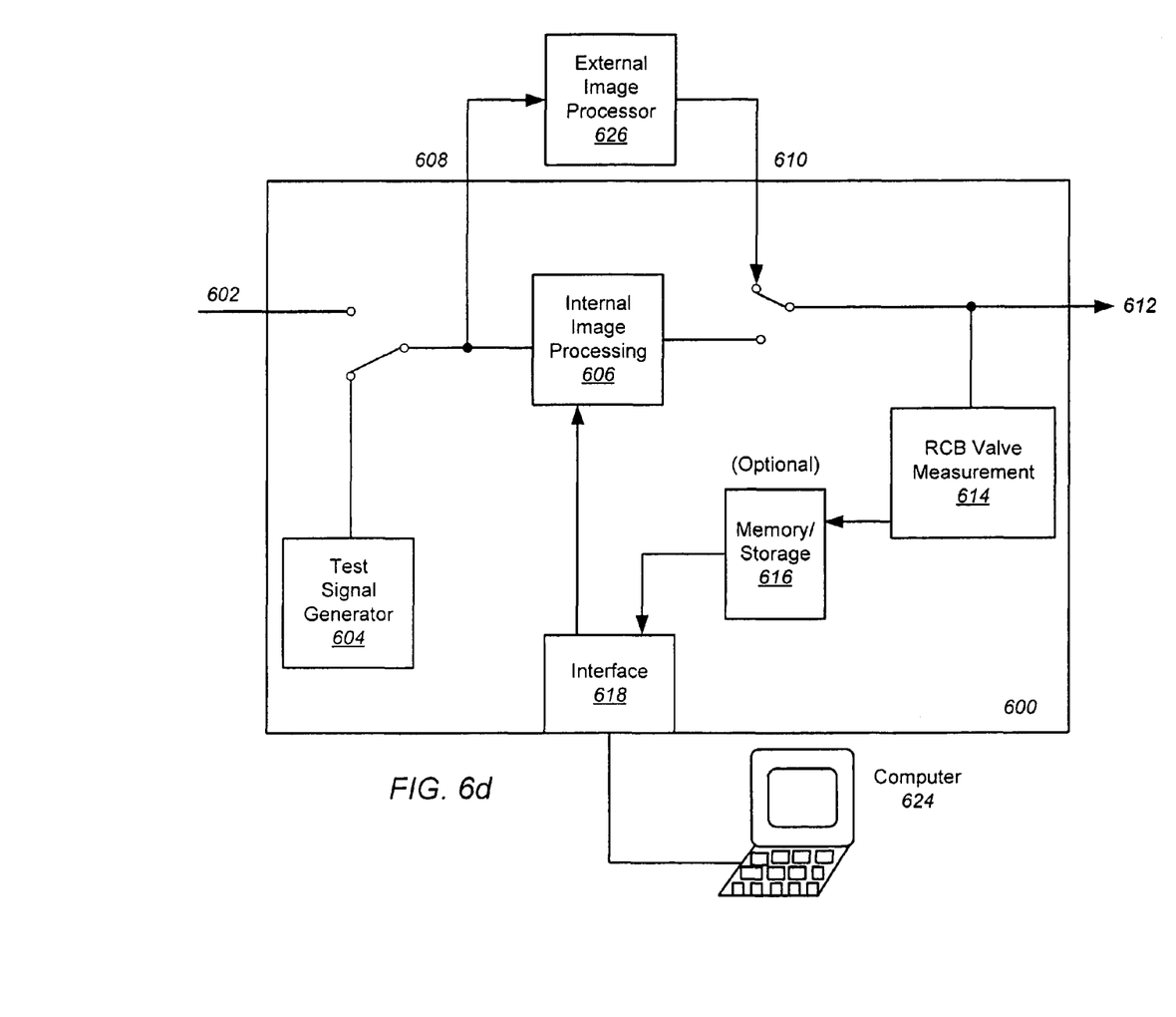
FIG. 6d illustrates an image processor in a system environment and operating in an external-3D LUT generation mode according to embodiments of the invention.

FIG. 6d illustrates the image processor 600 in an exemplary system environment and operating in an external-3D LUT generation mode according to embodiments of the invention. In the external-3D LUT generation mode, the test signal generator 604 is switched to be connected to internal image processing bypass output 608, which is connected to an external image processing device 626. Note that the connections may be standardized, such as a SMPTE standard for digital high definition signaling. The external image processing device 626 may perform color conversion and other image processing effects on test patterns provided from the test signal generator 604. The resulting output from the external image processor 626 is connected to internal image processor bypass input 610, which is switched to be connected to RGB value measurement block 614. Note that the test patterns provided from the test signal generator 604 may be in a standardized digital high definition format that can be received by the external signal processor 626, and the output of the external signal processor may also be in the same standardized digital high definition format that can be received by the RGB value measurement block 614. RGB value measurement block 614 then measures the output from the external image processor 626, and stores this output in external computer 624 via interface 618.

In this mode, a 3D LUT representative of most or all of the image processing in external image processor 626 can be generated and captured in computer 624. The resultant 3D LUT can then be utilized by other image processors to reproduce the image processing of the external image processor 626.

Figure 6E:
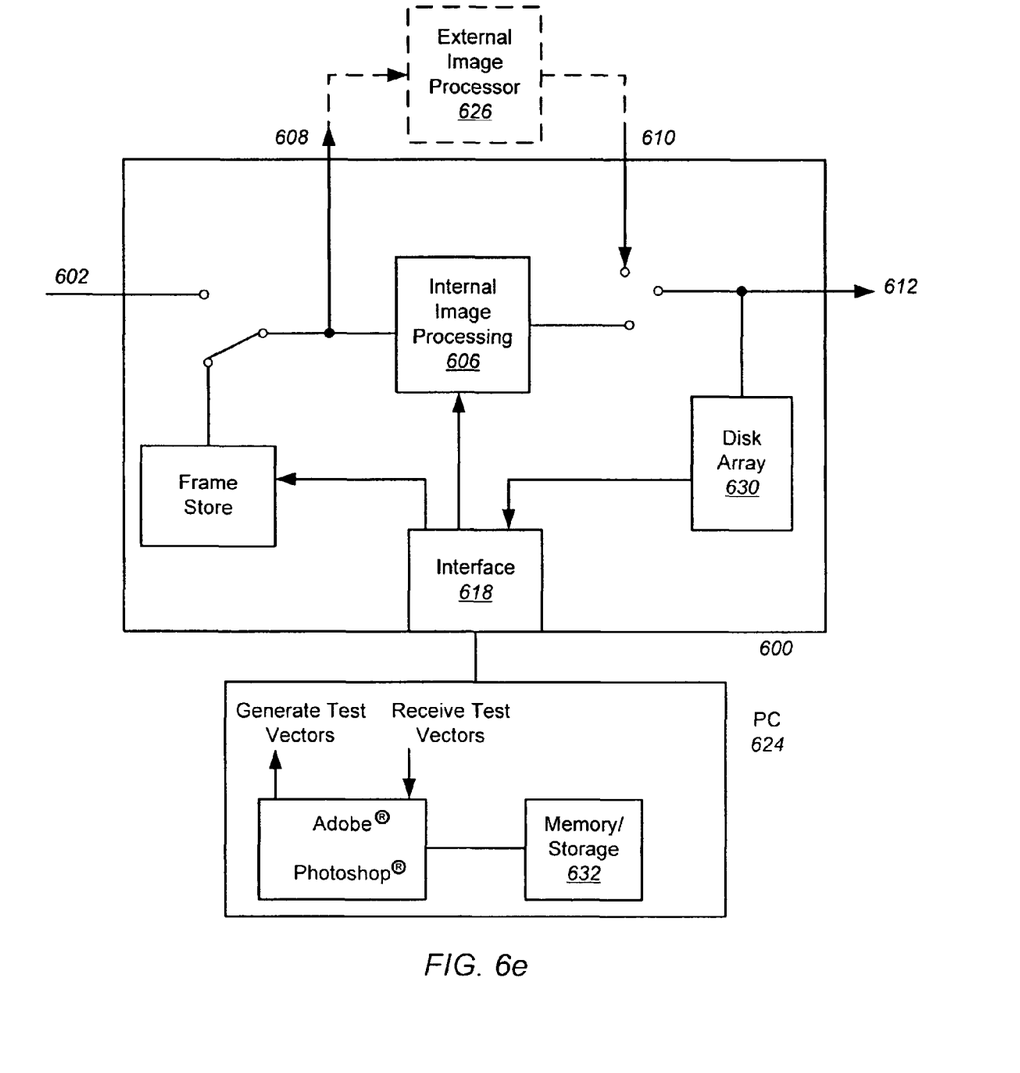
FIG. 6e illustrates an alternative configuration applicable to capturing the image processing from either internal image processing or an external image processor according to embodiments of the invention.

FIG. 6e illustrates an alternative configuration applicable to capturing the image processing from either internal image processing or an external image processor according to embodiments of the invention. In FIG. 6e, computer 624 running a digital imaging application such as Adobe® Photoshop® may generate and download test signals into a frame store 628 within image processor 600. At this point-in time, the computer 624 may be disconnected from the image processor 600 to simplify in-field use. The result of either internal image processing 606 or external image processing 626 may be captured in memory or storage such as a disk array or frame store 630. At a later time, the computer 624 may be re-connected to the image processor 600, and the results can be downloaded to computer 624, where a digital imaging application such as Adobe® Photoshop® may again be used to determine the color values and store them in memory or storage 632.

Figure 7A:
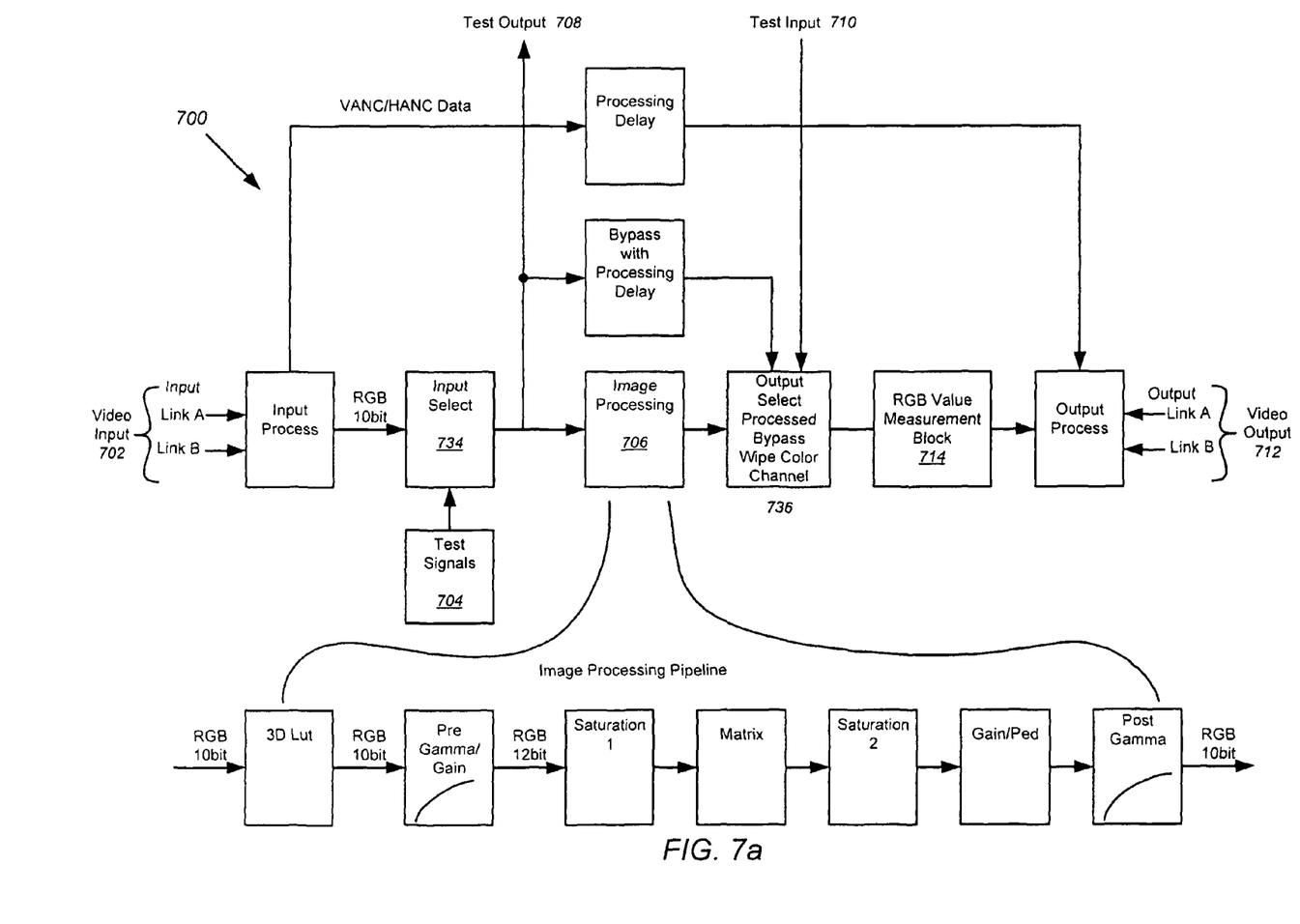
FIG. 7a illustrates a more detailed view of an exemplary image processor according to embodiments of the invention.

FIG. 7a illustrates a more detailed view of an exemplary image processor according to embodiments of the invention. In FIG. 7, a digital image input 702 is provided for receiving digital image data when the image processor 700 is being used in its normal mode, to perform image processing on an incoming video image. Note that the digital image input 702 includes Link A and Link B inputs in accordance with the SMPTE standard. However, within image processor 700 is a test signal generator 704 which is capable of automatically generating test patterns when the image processor is being used to generate a 3D LUT representative of its image processing. Either the digital image input 702 or the test signal generator 704 can be switched in input select block 734 to feed into the internal image processing block 706 and an internal image processing bypass output 708. Either the output of the image processing block 706 or an internal image processing bypass input 710 can be switched in output select block 736 to feed a digital image output 712 or an RGB value measurement block 714. The RGB value measurement block 714 may have counters that count the horizontal pixels (x) along a line, and counters that count the number of lines (y) in the image. A "measurement" of color is taken along various x and y locations. The measurements for a particular line may then be captured in a line store.

Figure 7B:
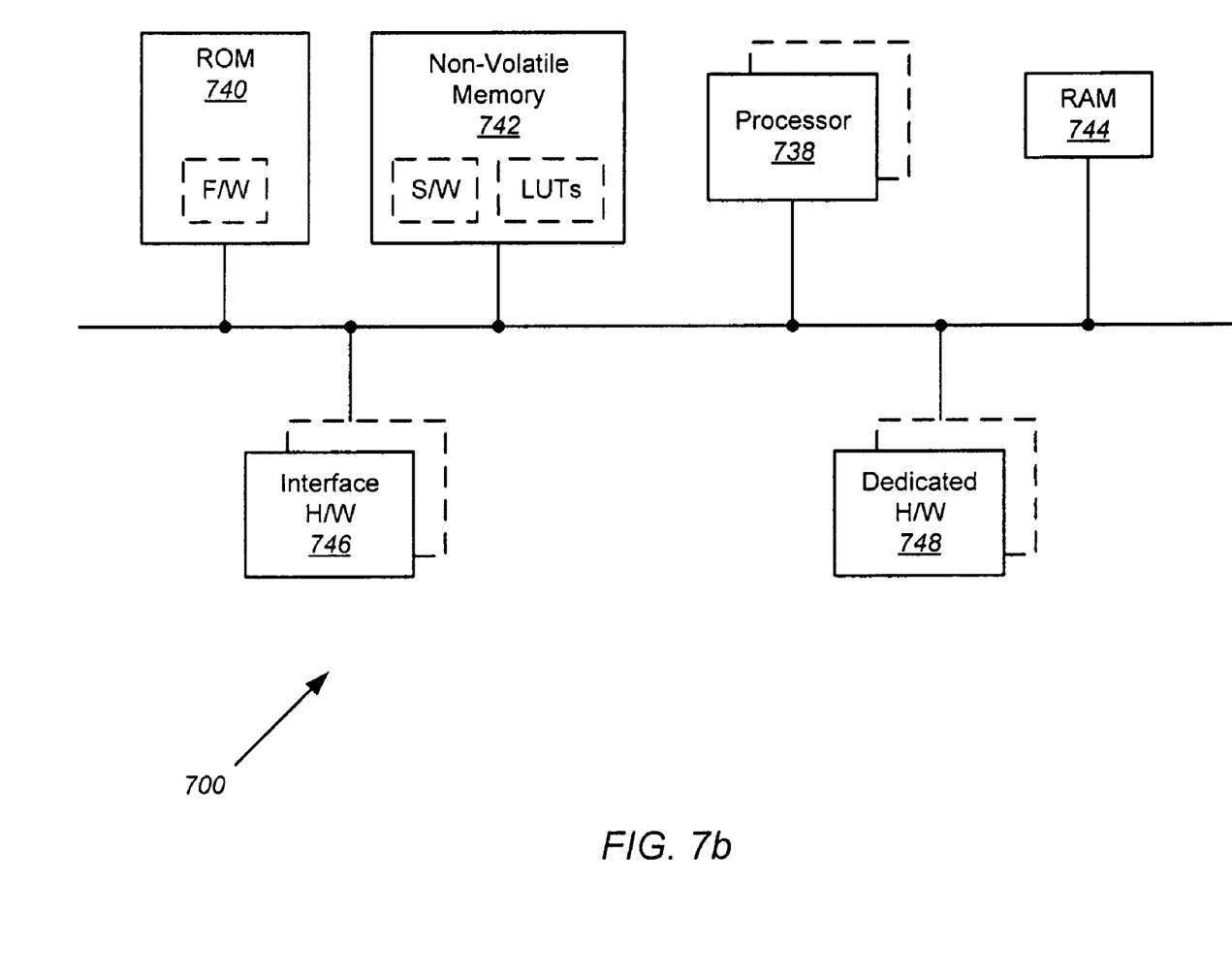
FIG. 7b illustrates an exemplary hardware block diagram of the image processor according to embodiments of the invention.

FIG. 7b illustrates an exemplary hardware block diagram of the image processor 700 according to embodiments of the invention. In FIG. 7b, one or more processors 738 may be coupled to read-only memory 740, non-volatile read/write memory 742, and random-access memory 744, which may store the boot code, BIOS, firmware, software, and any tables necessary to perform the processing of FIG. 7a. In addition, one or more hardware interfaces 746 may be connected to the processor 738 and memory devices to communicate with external devices such as PCs, storage devices and the like. Furthermore, one or more dedicated hardware blocks, engines or state machines 748 may also be connected to the processor 738 and memory devices to perform specific processing operations.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An apparatus for automatically generating a three-dimensional look-up table (3D LUT) representing image processing, comprising:
    a digital image input for receiving digital image data;
    a test signal generator configured to generate digital test patterns;
    an image processor configured to perform color conversion on received image data and generate converted digital image data;
    a first switch coupled for providing either the digital image data from the digital image input or the digital test patterns from the test signal generator to the image processor;
    a red/green/blue (RGB) value measurement circuit coupled to the image processor and configured to measure RGB values from the converted digital image data; and
    a digital image output coupled to the image processor for providing the converted digital image data to an external display.

2. The apparatus of claim 1, further comprising a digital interface coupled to the image processor for adjusting the converted digital image data as generated from the digital image data.

3. The apparatus of claim 1, further comprising an internal image processor bypass output coupled to the first switch and couplable to an external image processor for providing either the digital image data from the digital image input or the digital test patterns from the test signal generator to the external image processor.

4. The apparatus of claim 3, further comprising:
    an internal image processor bypass input; and
    a second switch coupled for providing either converted digital image data from the external image processor or converted digital image data from the internal image processor to the RGB value measurement circuit and the digital image output.

5. The apparatus of claim 1, further comprising a memory element coupled to the RGB value measurement circuit for storing the measured RGB values from the RGB value measurement circuit.

6. The apparatus of claim 1, the test signal generator comprising a frame store and the RGB value measurement circuit comprising a memory device, wherein the frame store and the memory device are coupled to a digital interface for receiving input test patterns from and providing measured RGB values to an external computer.

7. The apparatus of claim 1, further comprising a digital video camera coupled to the digital image input and a display coupled to the digital image output.

8. The apparatus of claim 2, further comprising a computer coupled to the digital interface.

9. The apparatus of claim 4, further comprising a digital interface coupled to the image processor for adjusting the converted digital image data as generated from the digital image data, a computer coupled to the digital interface, and an external image processor coupled to the internal image processor bypass output and the internal image processor bypass input.

10. A method for automatically generating a three-dimensional look-up table (3D LUT) representing image processing, comprising:
    generating digital test patterns within a unitary image processing apparatus;
    performing color conversion on the digital test patterns and generating converted digital image data;
    measuring red/green/blue (RGB) values from the converted digital image data within the unitary image processing apparatus; and
    generating a 3D LUT based on the measured RGB values.

11. The method of claim 10, further comprising:
    performing the color conversion on the digital test patterns and generating the converted digital image data using an image processor internal to the unitary image processing apparatus.

12. The method of claim 11, wherein prior to the steps of generating digital test patterns, performing color conversion, generating converted digital image data, and measuring RGB values, the method further comprises:
    receiving digital image data, performing color conversion on the digital image data, and adjusting the color conversion on the digital image data, all within the unitary image processing apparatus.

13. The method of claim 12, further comprising:
    performing the color conversion on either the digital test patterns or the received digital image data by switching between the digital image data and the digital test patterns within the unitary image processing apparatus.

14. The method of claim 11, further comprising controlling the color conversion using an external computer coupled to the unitary image processing apparatus.

15. The method of claim 10, further comprising:
    performing the color conversion on the digital test patterns and generating the converted digital image data using an external image processor coupled to the unitary image processing apparatus.

16. The method of claim 15, further comprising:
    measuring the RGB values from the converted digital image data from either the external image processor or an image processor internal to the unitary image processing apparatus by switching between the external image processor and the internal image processor.

17. The method of claim 10, further comprising storing the measured RGB values into a memory element.

18. The method of claim 10, further comprising:
    generating the digital test patterns from a frame store within the unitary image processing apparatus, the frame store receiving the digital test patterns from an external computer; and
    measuring the RGB values from the converted digital image data by first capturing the RGB values into a memory device and providing the measured RGB values to the external computer.

19. The method of claim 12, further comprising providing the digital image data from a digital video camera, and adjusting the color conversion on the digital image data using a display.

20. An apparatus for automatically generating a three-dimensional look-up table (3D LUT) representing image processing, comprising:
- means for generating digital test patterns within a unitary image processing apparatus;
- means for performing color conversion on the digital test patterns and generating converted digital image data;
- means for measuring red/green/blue (RGB) values from the converted digital image data within the unitary image processing apparatus; and
- means for generating a 3D LUT based on the measured RGB values.

* * * * *